United States Patent
Nyffenegger

(10) Patent No.: US 8,118,485 B2
(45) Date of Patent: Feb. 21, 2012

(54) VERY HIGH SPEED THIN FILM RTD SANDWICH

(75) Inventor: Johannes F. Nyffenegger, Laguna Niguel, CA (US)

(73) Assignee: AGlobal Tech, LLC, Las Vegas, NV (US)

( * ) Notice: Subject to any disclaimer, the term of this patent is extended or adjusted under 35 U.S.C. 154(b) by 297 days.

(21) Appl. No.: 12/204,734

(22) Filed: Sep. 4, 2008

(65) Prior Publication Data
US 2010/0074298 A1 Mar. 25, 2010

(51) Int. Cl.
G01K 7/16 (2006.01)
H01C 7/04 (2006.01)

(52) U.S. Cl. ........ 374/185; 374/163; 374/183; 374/208; 338/22 R

(58) Field of Classification Search .................. 374/100, 374/163, 183, 185, 208; 73/866.5; 338/22 R, 338/25, 28
See application file for complete search history.

(56) References Cited

U.S. PATENT DOCUMENTS

| | | | | |
|---|---|---|---|---|
| RE28,597 E | * | 10/1975 | Horii et al. | 338/275 |
| 3,979,229 A | * | 9/1976 | Barton et al. | 136/232 |
| 4,085,398 A | * | 4/1978 | Bertram et al. | 338/25 |
| 4,139,833 A | * | 2/1979 | Kirsch | 338/308 |
| 4,952,902 A | * | 8/1990 | Kawaguchi et al. | 338/22 R |
| 5,134,248 A | * | 7/1992 | Kiec et al. | 174/84 R |
| 5,662,418 A | | 9/1997 | Deak et al. | |
| 5,753,835 A | * | 5/1998 | Gustin | 73/866.5 |
| 5,864,282 A | * | 1/1999 | Hannigan et al. | 338/30 |
| 6,014,073 A | * | 1/2000 | Torii et al. | 338/25 |
| 6,151,771 A | * | 11/2000 | Tzeng et al. | 29/610.1 |
| 6,354,736 B1 | * | 3/2002 | Cole et al. | 374/185 |
| 6,592,253 B2 | | 7/2003 | Nyffenegger et al. | |
| 7,168,330 B1 | | 1/2007 | Nyffenegger | |
| 7,682,076 B2 | * | 3/2010 | Landis et al. | 374/185 |
| 7,855,632 B1 | * | 12/2010 | Schuh et al. | 338/28 |
| 2002/0048312 A1 | * | 4/2002 | Schurr et al. | 374/208 |
| 2006/0165153 A1 | * | 7/2006 | Tillman et al. | 374/208 |
| 2007/0252672 A1 | * | 11/2007 | Nyffenegger | 338/28 |
| 2009/0260431 A1 | * | 10/2009 | Olin et al. | 73/204.22 |
| 2009/0296781 A1 | * | 12/2009 | Weber et al. | 374/185 |
| 2011/0068890 A1 | * | 3/2011 | Yang et al. | 338/22 R |

FOREIGN PATENT DOCUMENTS

| | | | | |
|---|---|---|---|---|
| EP | 338522 A2 | * | 10/1989 | |
| JP | 03131002 A | * | 6/1991 | |
| JP | 06005404 A | * | 1/1994 | |
| JP | 06230027 A | * | 8/1994 | |
| JP | 06265402 A | * | 9/1994 | |
| JP | 10125508 A | * | 5/1998 | |

* cited by examiner

Primary Examiner — Gail Verbitsky

(57) ABSTRACT

A very high speed thin film RTD sandwich is provided that can be used in high speed temperature probes for medical applications and in environments that are corrosive or hostile in a protected configuration, as well as ambient and surface temperature measurements in an unprotected configuration. The high speed is achieved by maximizing the transfer of heat from the outside perimeter of the sandwich to its internal thin film RTD element to the absolute minimum of time. The thin film RTD element is electrically insulated by the extremely thin film layers. The insulating layers and thin film RTD are then embedded in two layers of high purity silver, the element with the maximum conduction coefficient of heat transfer k.

10 Claims, 2 Drawing Sheets

VERY HIGH SPEED THIN FILM RTD SANDWICH

TECHNICAL FIELD

The present invention is generally directed to the field of measuring devices and more particularly, is directed to a very high speed thin film RTD sandwich that can be used in a temperature probe. Resulting probes made from the thin film RTD sandwich of the present invention have particular applications in the medical field as well as in environments that are corrosive or hostile.

BACKGROUND OF THE TECHNOLOGY

Temperature probes are used in many applications for measuring the temperature of various objects and environments. U.S. Pat. Nos. 6,592,253 and 7,168,330, in which the Applicant is an inventor, describe prior art embodiments of a temperature probe or combination pressure/temperature transducer, or combination pressure/temperature/flow transducer, respectively.

The fastest thin film resistive temperature device (RTD) elements currently available today for use in temperature probes are not very suitable for high speed measurements in the medical field as well as in environments that are corrosive or hostile, as their thermal time constant ranges somewhere between 50 ms and 200 ms, or even longer. Additionally, the thermal time constants are not consistent and can vary considerably from manufacturing lot to lot.

A thin film RTD element's thermal time constant determines a temperature probe's response time to temperature measurements and thus, determines its speed. Speed can be an important consideration when selecting a temperature probe, especially in medical applications where the invasive nature of the measurement, or the particular needs of the patient, may limit the time available to make the measurement. The ability to make high speed temperature measurements also is important in corrosive or hostile environments where prolonged exposure to the media or environment can damage the probe.

One accepted definition of the thermal time constant of a temperature probe of any type is the time in seconds, or milliseconds, that it takes the probe's sensor, such as a thin film RTD element, to sense and respond to a temperature change of 63.2% of a specific temperature range. Another accepted definition is the length of time that it takes the probe to sense a temperature change from 10% to 90% of a specific temperature range.

A widely accepted temperature range for the measurement and calibration of the time constant of a thin film RTD, for example, is the temperature range represented by an agitated ice bath at the lower end and boiling water at the upper end, i.e. 0° C. and 100° C., respectively. These two temperatures are often used as a calibration or test temperature range because they are relatively easy to generate and to maintain.

While the thermal time constants of prior art thin film RTDs have improved, the improvements have not kept pace with developments in other areas of technology and the associated need to measure temperatures more quickly and in more unstable and hostile environments.

Past experience also indicates that the construction of a thin film RTD element generally is not consistent, as the size of the protective glass beads on the best products available can and do vary considerably, resulting in inferior temperature probe performance.

Past experience strongly indicates that a new approach is needed in the development and design of very fast thin film RTD elements for applications in the very high speed measurement of critical temperatures in extremely corrosive and hostile environments, or in a medical environment.

These and other benefits are realized with the very high speed thin film RTD element of the present invention.

SUMMARY OF THE INVENTION

The present invention addresses the problems and shortcomings of thin film RTD elements that are known in the prior art. The RTD element of the present invention has a much lower thermal time constant. Thus, it may be used in a temperature probe to make much higher speed temperature measurements. In addition to medical applications, a temperature probe utilizing the present invention can also be used to make temperature measurements in extremely corrosive and hostile environments.

It has been discovered that the thin film RTD element of the present invention meets or exceeds the following basic specifications:

a) Thermal time constant of ≦5 ms.
b) Temperature measurements ranging from −196° C. up to +1000° C.
c) Thin film RTD materials, such as Platinum, Copper, Nickel, or other materials.
d) Thin film RTD resistance, such as 100 Ω, 500 Ω, 1 kΩ, 10 kΩ, or other resistances.
e) Thin film RTD temperature coefficient TC, such as 3850, or other temperature coefficients.
f) Thin film RTD classification A, B, per DIN EN 60751, or other applicable specifications.
g) Enamel insulated signal wires, either in two wire, three wire or four wire configurations.
h) Flexible printed circuit board type signal connection, either in two conductor, three conductor or four conductor configuration.
i) Specifically designed for simplified integration into temperature probes for very high speed temperature measurements in extremely corrosive and hostile environments.
j) Specifically designed for simplified integration into extremely small temperature probes for very high speed temperature measurements in medical environments.

The novel features of the present invention are set out with particularity in the following detailed description of the preferred embodiment. However, the invention will be understood more fully and clearly from the detailed description of the invention as set forth in the accompanying drawings in which:

DETAILED DESCRIPTION OF THE PREFERRED EMBODIMENT

A preferred embodiment of the present invention will now be described with reference to the drawings.

Figure 1:
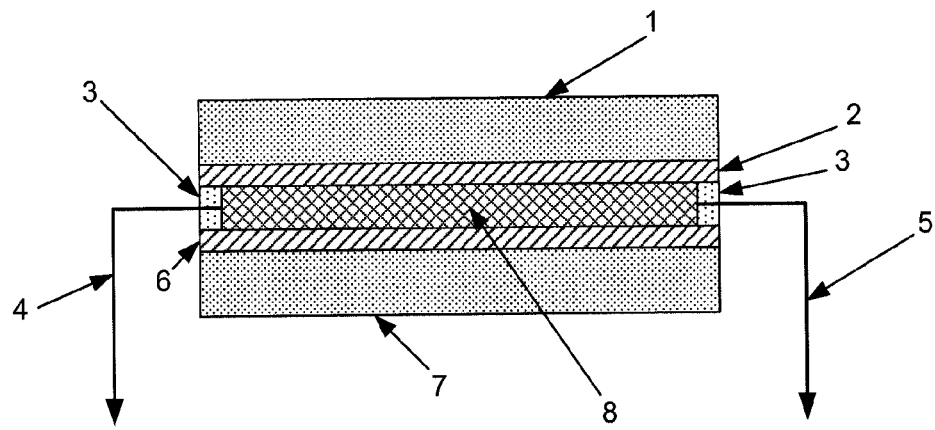
FIG. 1 is a cross-section of the thin film RTD sandwich illustrated in FIG. 2 in accordance with the present invention.

FIG. 1 is a cross-section of the thin film RTD sandwich of the present invention.

The concept of the design of the present invention is to place a thin film RTD 8, insulated by extremely thin film layers 2 and 6 of phenolic, or other insulating substrate material, between two layers of high purity silver layers 1 and 7.

Phenolic layers 2 and 6 are configured to have the absolute minimum of thickness by applying them sequentially to both sides of thin film RTD 8 using liquid phenolic substrate deposition, a process which is known in the art. Layers 2 and 6 may also be formed from Teflon, Mylar, polyimides, or other suitable plastic insulator materials. Additionally, silicone and other semiconductor substrates may also be considered for certain applications. Also, any ceramic substrate and any other insulating material may be considered as well. The thickness of these layers may be, for purposes of example only, 0.005 inches per layer or preferably less.

The thickness of pure silver layers 1 and 7 will depend on the application for the sandwich. Different applications will have different thicknesses. The thickness may be, for purposes of example only, 0.0025 inches per layer.

Thin film RTD layer 8 is sealed within the sandwich with a cured epoxy sealant 3 and is hermetically coupled to enamel insulated signal conductors 4 and 5.

Figure 2:
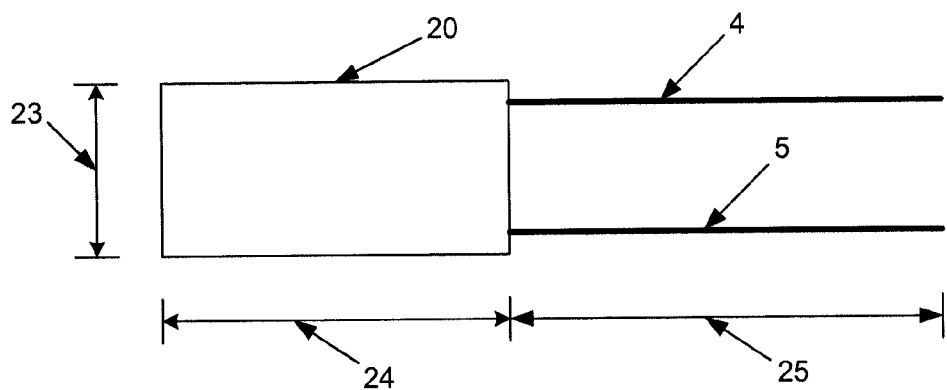
FIG. 2 is a front view of one embodiment of a thin film RTD sandwich in accordance with the present invention.

FIG. 2 illustrates a rectangular configuration of the thin film RTD sandwich which is also suitable for measuring ambient temperature in an unprotected configuration, in addition to protected applications in the medical field. In this configuration, and for purposes of example only, the length 24 of the body of the sandwich is approximately 0.079 inches long and its width 23 is approximately 0.49 inches long. These dimensions are provided for reference purposes only. The length 25 of its signal conductors 4 and 5 may be a maximum of 4.0 inches long.

Figure 3:
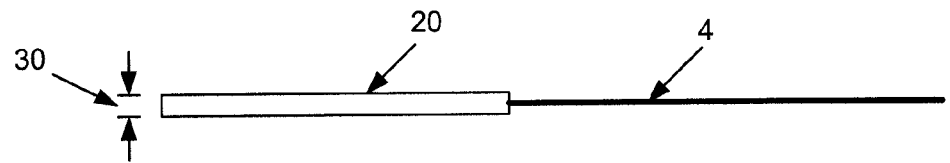
FIG. 3 is a side view of the thin film RTD sandwich of FIG. 2.

FIG. 3 is a side view of the rectangular configuration of the thin film RTD sandwich illustrated in FIG. 2 and has a thickness 30 of its body 20 of approximately 0.007 inches. These dimensions are, again, for references purposes only.

Figure 4:
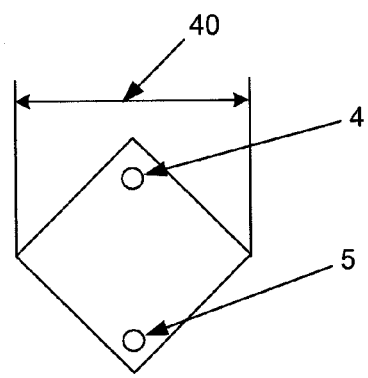
FIG. 4 a is bottom view of another embodiment of a thin film RTD sandwich in accordance with the present invention.

FIG. 4 illustrates a square configuration of the thin film RTD sandwich which is also suitable for measuring surface temperature in an unprotected configuration, in addition to protected applications in corrosive and hostile environments. In this configuration, and for purposes of example only, the diagonal length 40 of the body of the sandwich is approximately 0.049 inches long.

Figure 5:
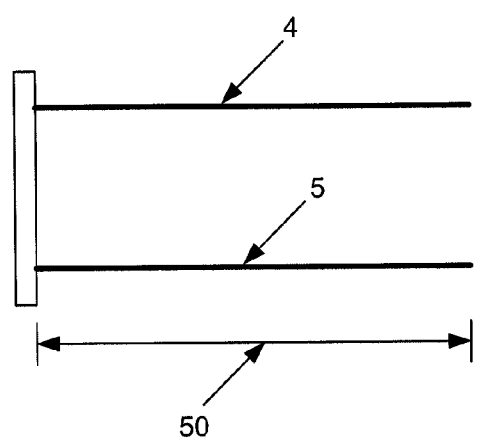
FIG. 5 is a side view of the thin film RTD sandwich of FIG. 4.

FIG. 5 is a side view of the square configuration of the thin film RTD sandwich illustrated in FIG. 4, having a length 50 of signal conductors 4 and 5 which may be a maximum of approximately 4.0 inches long.

Figure 6:
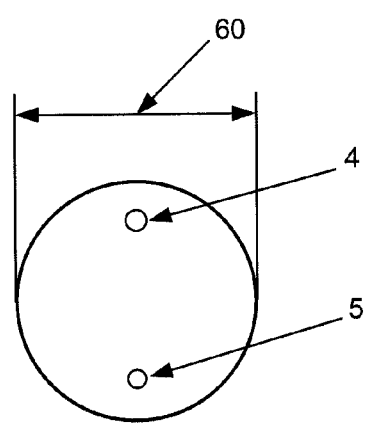
FIG. 6 is a bottom view of a still further embodiment of a thin film RTD sandwich in accordance with the present invention.

FIG. 6 illustrates a circular configuration of the thin film RTD sandwich which is also suitable for measuring surface temperature in an unprotected configuration, in addition to protected applications in corrosive and hostile environments. In this configuration, and for purposes of example only, the diameter 60 of the body of the sandwich is approximately 0.049 inches.

Figure 7:
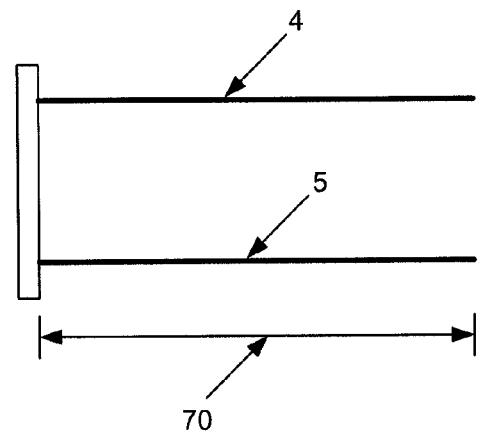
FIG. 7 is a side view of the thin film RTD sandwich of FIG. 6.

FIG. 7 is a side view of the circular configuration of the thin film RTD sandwich illustrated in FIG. 6, having a length 70 of signal conductors 4 and 5 which may be a maximum of approximately 4.0 inches long.

It is important to maximize the transfer of heat from the outside perimeter of the sandwich to the thin film RTD element 8 located at the core of the sandwich to an absolute minimum of time. In order to accomplish this objective, thin film RTD 8 must be electrically insulated by the extremely thin film layers 2 and 6 of phenolic, or other suitable insulating substrate. Layers 2 and 6 and thin film RTD 8 are, in turn, embedded in two layers 1 and 7 of high purity silver, the element with the maximum conduction coefficient of heat transfer k.

The rate at which heat is conducted and propagates through a medium is defined by the following equation for thermal diffusivity K:

$$K = k/\rho Cp$$

Where:
 k=Conduction coefficient of heat transfer
 Cp=Specific heat
 $\rho$=Density This means, that the greater the conduction coefficient of heat transfer k is, the faster heat propagates through a medium.

The conduction coefficient of heat k in Btu.in/hr.ft$^2$.° F. is for
 Silver=2904; and
 Phenolic Substract=1.32.

Thus, the overall time constant of the thin film RTD sandwich is maximized by (1) keeping the thicknesses of the electrical insulation layer of the phenolic, or other substrate material, at an absolute minimum and by (2) protecting the sandwich on each side with a layer of high purity silver.

The advantages of the thin film RTD sandwich of the present invention include, but are not limited to, the following:
 a) An order of magnitude faster thermal time constant than any other thin film RTD element known in the prior art.
 b) Simple to integrate into high speed temperature probes for temperature measurements in extremely corrosive and hostile environments.
 c) Very small configuration for simple integration into high speed temperature probes for temperature measurements in medical environments.

It has been found that the thin film RTD sandwich of the present invention has a number of practical applications as described below.

High Energy Chemical Lasers, Process Control

The control of a high energy chemical laser requires reliable, repeated, accurate measurements of temperature in mission critical chemical processes at extremely high speeds in highly corrosive and hostile environments. Additionally, the instruments performing these critical measurements are required to directly interface with sophisticated computerized data acquisition systems and are required to pass flight certification requirements. The invention is capable of complying with, or exceeding, all these requirements.

High Energy Chemical Lasers, Optical Mirror Diagnostics

The control of a high energy chemical laser requires reliable, repeated, accurate measurements of mirror surface temperatures for diagnostic purposes at extremely high speeds. Additionally, the instruments performing these critical measurements are required to directly interface with a sophisticated computerized data acquisition system and are required to pass flight certification. The invention is capable of complying with, or exceeding, all these requirements.

High Energy Chemical Lasers, Energy Diagnostics

The control of a high energy chemical laser requires reliable, repeated, accurate measurements of laser power for diagnostic purposes at extremely high speeds. Additionally, the instruments performing these critical measurements are required to directly interface with a sophisticated computerized data acquisition system and are required to pass flight certification. The invention is capable of complying with, or exceeding, these requirements.

Medical—Neurology

Certain surgical procedures in neurology require reliable, repeated and accurate measurements of spinal fluid temperatures at extremely high speeds in a medical environment. Additionally, the instruments performing these critical measurements are required to directly interface with sophisticated computerized medical process control systems used to monitor and control vital patient parameters. The invention is capable of complying with, or exceeding, all these requirements.

Fishing, Commercial

Certain species of fish follow and feed in specific temperature gradient boundaries occurring in the ocean water surface down to a certain depth. The accurate and extremely fast detection of these minute ocean water surface temperature boundaries can be the determining factor in the success or failure of a commercial fishing enterprise. The instruments used to perform these measurements are required to operate reliably and repeatedly in the corrosive oceanic salt water environment.

The thin film RTD sandwich of the present invention is capable of complying with, or exceeding, these requirements.

Fishing, Recreational

The thin film RTD sandwich of the present invention may also be offered in an economical configuration, i.e. a configuration only used for recreational purposes and not in a demanding commercial environment.

While the foregoing specification teaches the principles of the present invention, with examples provided for the purpose of illustration, it will be appreciated by one skilled in the art from reading this disclosure that various changes in form and detail can be made without departing from the true scope of the invention.

I claim:

1. A thin firm RTD assembly, said assembly comprising:
   a thin film RTD element having first and second opposed surfaces and first and second edges;
   a first insulating layer positioned in direct contact with said first opposed surface of said thin film RTD element, said first insulating layer having a thickness no greater than 0.005 inches;
   a second insulating layer separate from said first insulating layer positioned in direct contact with said second opposed surface of said thin film RTD element, said second insulating layer having a thickness no greater than 0.005 inches;
   a first outer layer positioned in direct contact with said first insulating layer;
   a second outer layer separate from said first outer layer positioned in direct contact with said second insulating layer;
   a cured epoxy sealant disposed around said first and second edges of said thin film RTD to thereby seal said edges from direct exposure to the environment; and
   at least one signal conductor coupled to said thin film RTD element.

2. The thin firm RTD assembly of claim 1, wherein said first and second insulating layers are formed of a Teflon material.

3. The thin firm RTD assembly of claim 1, wherein said first and second insulating layers are formed of a Mylar material.

4. The thin firm RTD assembly of claim 1, wherein said first and second insulating layers are formed of polyimides.

5. The thin firm RTD assembly of claim 1, wherein said first and second insulating layers are formed of a silicone material.

6. The thin firm RTD assembly of claim 1, wherein said first and second insulating layers are formed of a ceramic material.

7. The thin firm RTD assembly of claim 1, wherein said first and second insulating layers are less than 0.006 inch in thickness.

8. The thin firm RTD assembly of claim 1, wherein said first and second outer layers are formed of silver material.

9. The thin firm RTD assembly of claim 1, wherein said first and second outer layers are less than 0.003 inch in thickness.

10. A thin firm RTD assembly, said assembly comprising:
    a thin film RTD element having first and second opposed surfaces and first and second edges;
    a first insulating layer positioned in direct contact with said first opposed surface of said thin film RTD element, said first insulating layer having a thickness no greater than 0.005 inches and being formed of a phenolic material;
    a second insulating layer separate from said first insulating layer positioned in direct contact with said second opposed surface of said thin film RTD element, said second insulating layer having a thickness no greater than 0.005 inches and being formed of a phenolic material;
    a first outer layer positioned in direct contact with said first insulating layer and being formed of a high purity silver material;
    a second outer layer separate from said first outer layer positioned in direct contact with said second insulating layer and being formed of a high purity silver material;
    a cured epoxy sealant disposed around said first and second edges of said thin film RTD to thereby seal said edges from direct exposure to the environment; and
    at least one signal conductor coupled to said thin film RTD element.

* * * * *